United States Patent [19]
MacKenna et al.

[11] Patent Number: 5,495,594
[45] Date of Patent: Feb. 27, 1996

[54] TECHNIQUE FOR AUTOMATICALLY ADAPTING A PERIPHERAL INTEGRATED CIRCUIT FOR OPERATION WITH A VARIETY OF MICROPROCESSOR CONTROL SIGNAL PROTOCOLS

[75] Inventors: Craig A. MacKenna, Los Gatos; Monte J. Dalrymple, Fremont, both of Calif.

[73] Assignee: Zilog, Inc., Campbell, Calif.

[21] Appl. No.: 248,468

[22] Filed: May 24, 1994

Related U.S. Application Data

[63] Continuation of Ser. No. 729,423, Jul. 12, 1991, abandoned.

[51] Int. Cl.$^6$ .................................................. G06F 13/00
[52] U.S. Cl. .................. 395/500; 364/232.8; 364/232.2; 364/240.8; 364/DIG. 1
[58] Field of Search ...................................... 395/500, 325

[56] References Cited

U.S. PATENT DOCUMENTS

| | | | |
|---|---|---|---|
| 4,964,074 | 10/1990 | Suzuki et al. | 395/500 |
| 4,967,346 | 10/1990 | Freidin | 395/500 |
| 4,991,085 | 2/1991 | Plena et al. | 395/275 |
| 5,014,236 | 5/1991 | Pogonzelski et al. | 395/275 |
| 5,025,412 | 6/1991 | Dalrymple et al. | 395/275 |
| 5,155,839 | 10/1992 | Weppler | 395/500 |
| 5,165,037 | 11/1992 | Culley | 395/800 |
| 5,321,827 | 6/1994 | Lu et al. | 395/500 |
| 5,325,490 | 6/1994 | Brasseu | 395/325 |

*Primary Examiner*—Kevin J. Teska
*Assistant Examiner*—Agni Mohamed
*Attorney, Agent, or Firm*—Majestic, Parsons, Siebert & Hsue

[57] ABSTRACT

By monitoring various combinations of control signals generated by a microprocessor in a computer system in the first operational cycles after it is reset, a peripheral circuit sets itself to respond appropriately to control signals from the microprocessor according to any of several different protocols. For example, an instruction from the microprocessor to write to or read from the peripheral circuit is implemented over two control lines with one of several possible protocols. The circuit determines which protocol is being used each time the system is initialized and thereafter knows when a read or write operation is being performed. Another example is the different wait or acknowledge protocols that various microprocessors use. The peripheral circuit can thus be used with a variety of microprocessors without having to provide sets of pins dedicated to each signal protocol used by available microprocessors, and without the necessity to load a configuration register in the peripheral circuit by the microprocessor as part of the initialization process.

3 Claims, 5 Drawing Sheets

1

TECHNIQUE FOR AUTOMATICALLY ADAPTING A PERIPHERAL INTEGRATED CIRCUIT FOR OPERATION WITH A VARIETY OF MICROPROCESSOR CONTROL SIGNAL PROTOCOLS

This is a continuation of application Ser. No. 07/729,423, filed Jul. 12, 1991, now abandoned.

BACKGROUND OF THE INVENTION

This invention relates generally to the recognition and interpretation of the operational and control signals used by a computer system microprocessor, by its peripheral chips, and, more specifically, to providing peripheral chips that operate with several different types of microprocessors having various signaling protocols.

For several years after first making, in the mid-1970s, a complete microprocessor ("MPU") on a single integrated circuit chip, semiconductor manufacturers attempted to provide a complete family of peripheral circuit chips to be used with their microprocessors. Such peripheral chips typically function to provide parallel input-output, serial input-output, interface with system memory, memory management, direct memory access ("DMA") control, event counting and timing circuits, high speed numerical processing, and various other similar functions that need to be provided along with the MPU in order to form a complete computer system. In the beginning of microprocessor-based system technology, semiconductor manufacturers designed their own techniques and signal protocols for controlling operation of the peripheral circuits from the microprocessor. Although these techniques had many common aspects, they also had many differences that prevented a peripheral circuit of one semiconductor manufacturer from working with a microprocessor of another, or at least without the addition of translation or "glue" logic between them.

Over time, as the number of types of peripheral circuits being provided increased dramatically, along with an increasing number of microprocessor types, it became impossible for any single semiconductor manufacturer to provide a full line of peripherals for all of its own microprocessors. Also, as certain peripheral parts became popular because of better designs and more complete functions, computer system designers began to use peripheral devices of one semiconductor manufacturer family with a microprocessor of another. The trend lately has been for semiconductor manufacturers to design both microprocessors that can be more easily interfaced to an increasing number of peripheral devices, and to also design peripheral devices that can be more easily used with a variety of microprocessors from different manufacturers.

Each popular microprocessor still has its own particular interfacing requirements, including specific signal protocols, but there is a considerable commonality between them and the differences are now well defined. Examples of such differences include the use by some microprocessors of an 8-bit wide data bus and use by others of a 16-bit wide data bus. In the case of a 16-bit wide data bus, some microprocessors use the least significant address line (A0) to designate which half of the bus is being used to transfer a single byte of data, along with a single data strobe to transfer that byte, while other microprocessors use separate data strobes for transferring bytes on the lower and upper byte data bus lines. Further, microprocessors that so utilize the A0 line do so with different polarities.

Another example difference among microprocessors in communicating with peripheral devices is in designating whether data is to be written from the data bus to the peripheral device or read from it. In one arrangement, separate read and write strobe signals are provided. In another arrangement, one signal is provided to designate whether a read or write operation is to take place, and another signal acts as a data strobe to implement that operation. In the latter protocol, microprocessors also differ in the polarities used to designate the read-write control signal.

Another difference in control signal protocols among microprocessors is in the way they match the speed of their operation to that of the peripheral device. A peripheral circuit often needs to delay and slow down the operation of the microprocessor to allow the peripheral enough time to capture write data or provide read data asked of it by the microprocessor. Typical situations where this occurs is when the peripheral device is unable to provide read data to the microprocessor within the time required to maintain full speed operation of the microprocessor, or when the peripheral device is unable to accept and capture write data provided by the microprocessor quickly enough to allow the microprocessor to move on to its next operation at its full speed. Two alternative techniques have emerged for allowing the peripheral device to slow down the microprocessor in such circumstances. One method is for the peripheral device to emit a WAIT signal as soon as it recognizes that it is not going to be able to complete its designated task before the microprocessor will want to move on to its next operation. An alternative technique is for the peripheral device to emit an acknowledge (ACK) signal when it begins to perform an operation requested of it by the microprocessor and then terminate that signal when the task has been completed. Some microprocessors utilize one of these protocols, and others utilize the other protocol.

One early technique to provide a peripheral device to operate with microprocessors using any of such different signaling protocols was to provide a separate pin for each different signal and protocol, circuits then being provided as part of the peripheral device to utilize any of them. A given microprocessor was then connected with the appropriate pins of the peripheral device depending upon the microprocessors control signals and their protocols. Because higher pin counts and larger packages increase costs, such an approach requiring provision of redundant, unused pins is not often used.

Another technique currently used in peripheral devices for adapting them to various microprocessors utilizes a control register having fields whose bits determine which among various signaling protocols is to be used on a group of control signal pins. The control register is loaded each time the computer system in which the peripherals are used is initialized or reset. This technique is limited in its flexibility in that the operation of loading the control register is itself accomplished using at least some of the control signals being defined.

It is a primary object of the present invention to provide a technique that allows a peripheral device to automatically adapt to various types of microprocessor control signals and protocols, thereby to avoid having to use separate, redundant pins and avoiding the necessity of programming control register fields for this purpose.

SUMMARY OF THE INVENTION

This and additional objects are realized by the various aspects of the present invention wherein, briefly and generally, a peripheral device includes several control signal pins that are each connectable to different types of control signals and protocols used by various microprocessors, circuits being provided as part of the device to automatically recognize which signals and protocols are being used by the microprocessor. This is done by monitoring the signals during the first few operations performed by the microprocessor after initialization or reset of the computer system. After this initialization learning process is completed, the recognized one of the various different signals and protocols that can be connected to these pins is automatically converted within the peripheral circuit to a common protocol and set of signals. This protocol and signals are then utilized to control operation of the peripheral device circuitry, including, for example, control of its data bus configuration and transfers of data over it and a designation of the type of speed matching signaling that is to be utilized.

In the example peripheral circuit described below with respect to the drawings, a plurality of latches are connected through appropriate logic to a number of control signal pins including those which are designed to operate with different signal protocols. The state of several of these latches is set upon observing the types of signals used by the microprocessor during its first operations after initialization. Examples of such latches include one for determining whether the data bus is 8 or 16 bits wide, whether the A0 address line is utilized, and which read/write control signal protocol is used. The states of another set of latches observing many of the same microprocessor signals are set upon the first access by the microprocessor to the specific peripheral chip, specific constraints being set on the nature of the first access. Examples of information stored in this second set of latches is the polarity convention of the A0 signal, if used, and the polarity convention of a read/write signal, if used. A logic system receives the outputs of these latches and other incoming control signals to generate internal control signals that have the same protocol for any of the microprocessor signals that may be connected to the multipurpose control signal pins. Yet another latch learns whether the wait or acknowledge speed matching protocol is used by the microprocessor, and the information stored there connects either a wait logic circuit or an acknowledge logic circuit to a common pin.

Additional objects, features and advantages of the various aspects of the present invention will become apparent from the following description of its preferred embodiments, which description should be read in connection with the accompanying drawings.

DESCRIPTION OF THE PREFERRED EMBODIMENTS

Figure 1:
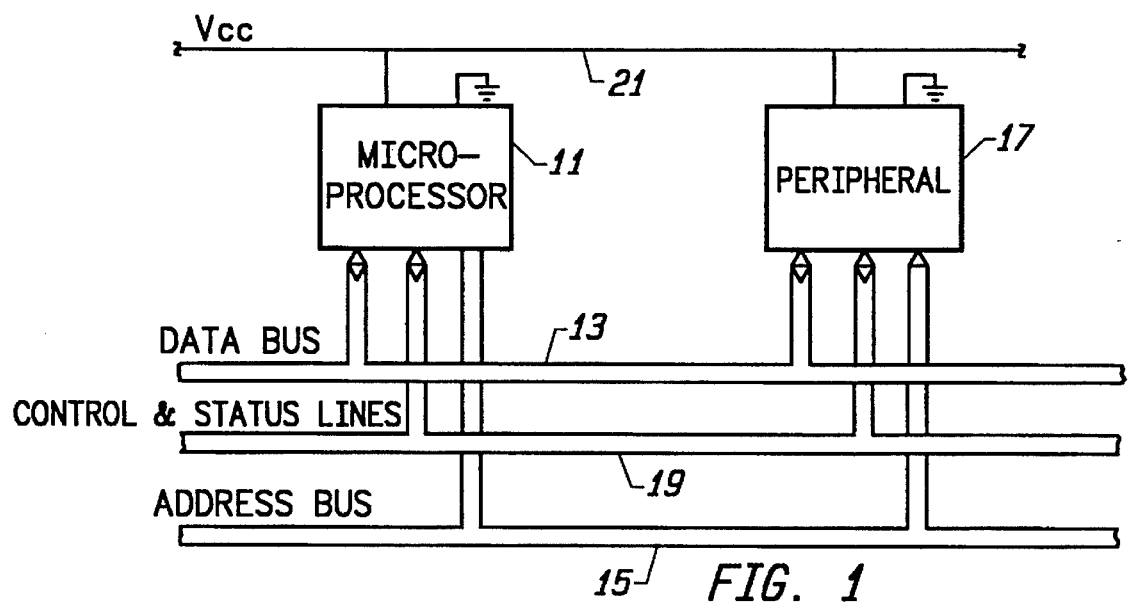
FIG. 1 shows in very general terms a portion of a computer system having a microprocessor and a peripheral connected to operate together.

Referring first to FIG. 1, a portion of a typical computer system is shown as background to explaining implementation examples of the various aspects of the present invention. A microprocessor integrated circuit device 11 is illustrated to be of a type that utilizes a data bus 13 that is separate from an address bus 15, although the invention can be used with a multiplexed address/data bus by simply capturing the state of address line 0 in a demultiplexing latch, the output of which is then connected to the A0 signal shown in the drawings. A peripheral integrated circuit device 17 is shown to be connected to those same busses. A number of system control and status lines 19 are also connected to each of the microprocessor 11 and peripheral 17, as is a voltage supply line 21. Of course, a complete computer system will include a number of additional peripheral integrated circuit devices, memories, timing circuits and the like, not shown in FIG. 1.

Figure 2:
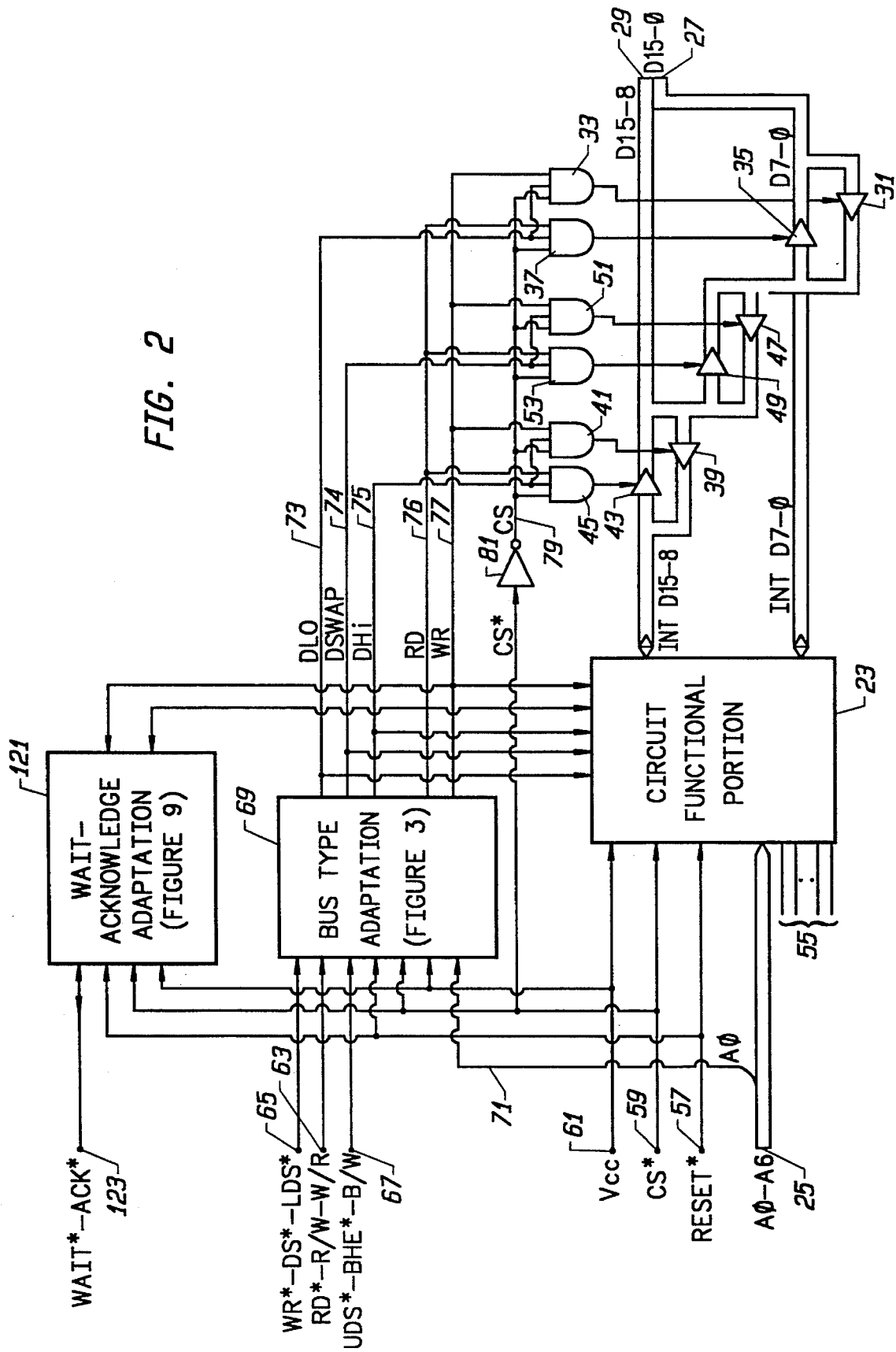
FIG. 2 is a block diagram of the peripheral circuit of FIG. 1.

It is the different types of signals and signal protocols communicating over the system control and status lines 19 between the microprocessor 11 and the peripheral circuits, including circuit 17, to which the peripherals are desirably designed to automatically adapt according to the present invention. Referring to FIG. 2, an example of such a peripheral is shown in a general schematic diagram. A primary portion 23 of the peripheral circuit performs the functions for which the circuit is utilized, such as a parallel input-output device, serial input-output device, memory interface, and the like. Any such circuit 23 may be connected through a plurality of package pins 25, in this case seven, to the system address bus, designated in this example as A0-A6, or it may be connected to the outputs of a plurality of demultiplexing latches that capture address information.

Similarly, the circuit portion 23 is connectable to a system data bus which may or may not also carry multiplexed addresses. Since one of the capabilities of a peripheral device using the present invention is to transfer data 16 bits at a time, circuit 23 includes an internal data bus that is 16 bits wide, and is divided into two 8-bit groups INT D15-8 and INT D7-0. One set of 8 device pins 27 is provided for connecting to an 8-bit system data bus D7-0 or to 8 lines of a system data bus that includes 16 or more data lines. Another set of 8 device pins 29 is provided for connecting to 8 more lines of a system data bus that includes 16 or more data lines. If the device is configured for 8-bit data only, the pins 29 can be used for other functions. In the initial commercial embodiment, they are used for "modem control signals". The data bus pins are connected to the INT D15-8 and INT D7-0 through a plurality of gated directional buffer amplifiers (drivers and receivers). An amplifier 31, when gated on by the output of an AND-gate 33, drives the state of the D7-0 pins onto INT D7-0 during a write operation. Similarly, such a buffer 35 drives, in response to the output of an AND-gate 37, the state of INT D7-0 onto the D7-0 pins during a read operation. Likewise, a write buffer 39, gated by an output of an AND-gate 41, and a read buffer 43, gated by an output of an AND-gate 45, control transfers between INT D15-8 and the D15-8 pins. Another set of such buffers 47 and 49 are gated from the outputs of respective AND-gates 51 and 53 for transferring between INT D15-8 and the D7-0 pins, which is required when the external system data bus is only 8 bits wide. The inputs to the controlling AND-gates just mentioned are described below.

In addition to the address and data buses, the primary functional circuit portion 23 will likely have a plurality of lines 55 that are connected to separate pins, a number depending upon the function of the circuit portion 23. For example, if it is a serial input-output device, lines 55 may be connected to another computer system, a printer, or a display terminal. For proper operation, the circuit also requires connection with at least a majority of the control and status lines 19 of the computer system. A pin 57 is designated for receiving a RESET* signal from the microprocessor 11. Similarly, a pin 59 is designated for receiving a chip select (CS*) signal from external address-decoding logic. Both of the pins 57 and 59 are connected directly to the main circuit portion 23. (The asterisk (*) used after the signal names herein is intended to identify those signals that are active when in their low voltage state.) Also, of course, at least one pin 61 needs to be provided for a voltage supply $V_{CC}$.

Figure 3:
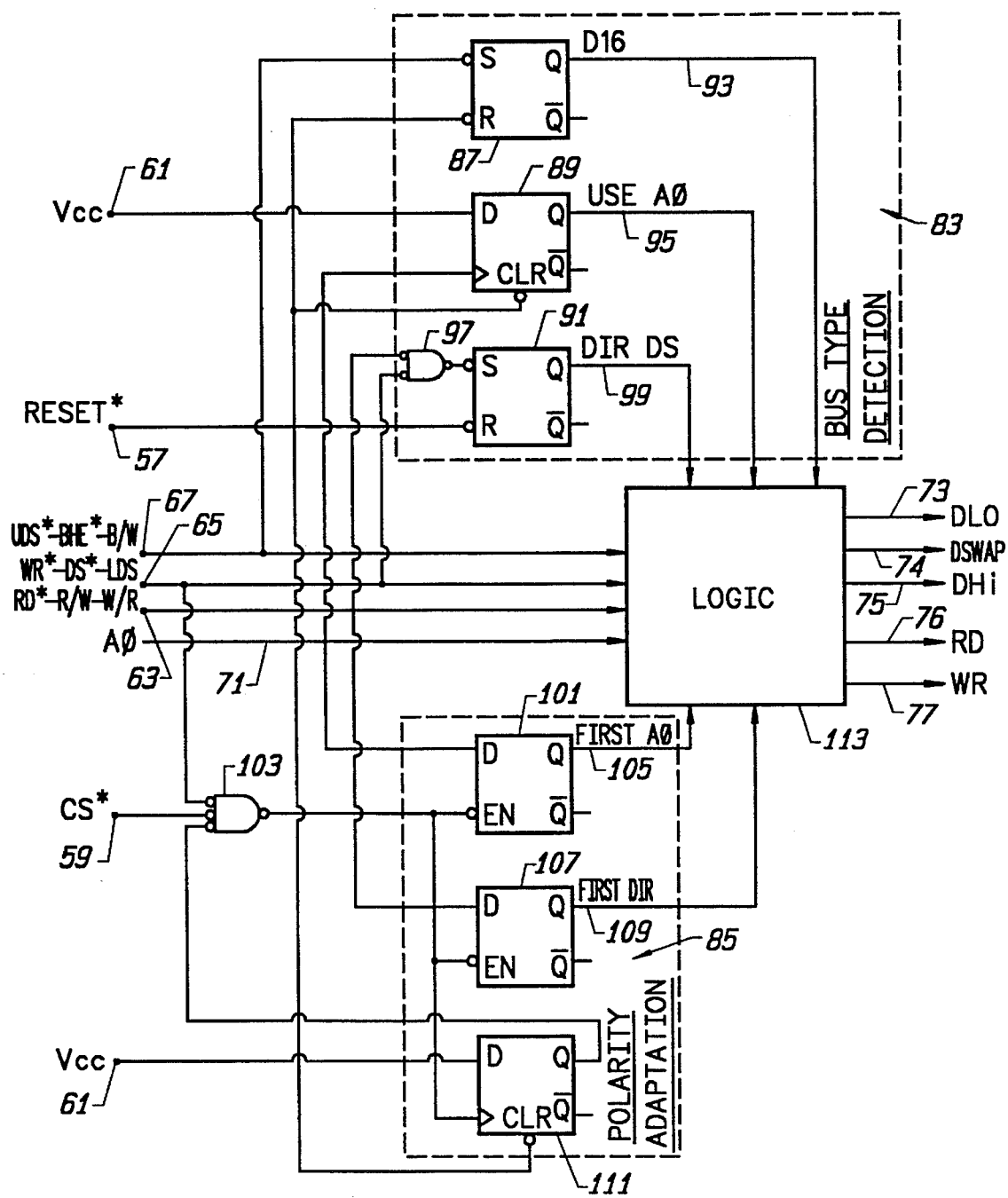
FIG. 3 is a circuit diagram of one of the blocks shown in FIG. 2.

The main functional circuit portion 23 likely requires connection with a number of the other system control and status lines 19 in order to operate, and certainly control signals are required from the microprocessor in order to direct the flow of data over the data bus by appropriately gating the various buffer amplifiers that are provided in the path of the data bus, as described above. Three pins 63, 65 and 67 are designated for connecting with three additional of the system control and status lines 19. But each of these three pins is intended to be connected to different control signals depending upon the type of microprocessor 11 with which the peripheral circuit is being used. Therefore, before signals from these pins are utilized within the peripheral circuit, they are passed through circuits indicated by a block 69. A primary purpose of the circuits 69, which are described below with respect to FIG. 3, is to recognize the types and protocols of the control signals from the microprocessor on pins 63, 65 and 67, as well as the protocol of the signal on an A0 address line 71, and then convert those signal protocols into a common set of data transfer control signals on lines 73–77. That is, the circuits 69 are able to recognize various different microprocessor control signals related to transfers of data over the data bus and translate those control signals into a form on lines 73–77 which is the same no matter which of the various microprocessor control signal protocols is being utilized. In addition to these internal control signal lines 73–77 being connected to the various data bus control AND-gates 33, 37, 51, 53, 41 and 45, they will also be used by the main circuit functional portion 23, to provide read data on, and capture write data from, the INT D15-8 and/or INT D7-0 lines.

Additionally, it should be noted that each of the data bus AND-gates 33, 37, 51, 53, 41 and 45 receive as an input a chip select (CS) signal in a line 79, a result of an inverter 81 receiving the CS* signal from the pin 59. This then limits any data transactions on the data bus to occur only when the microprocessor addresses this particular circuit for operation. As is usual, the chip select signal (CS*) is received at pin 59 from an external logic circuit that decodes the peripheral's address from the system address bus.

Figure 5A:
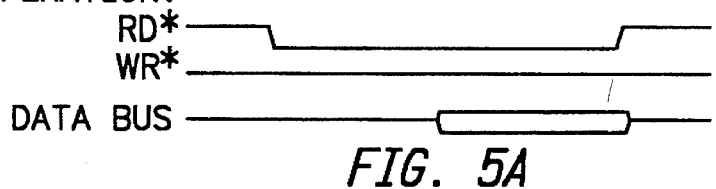
FIGS. 5(A) and 5(B) provide waveforms to illustrate one existing read-write signaling protocol.
Figure 5B:
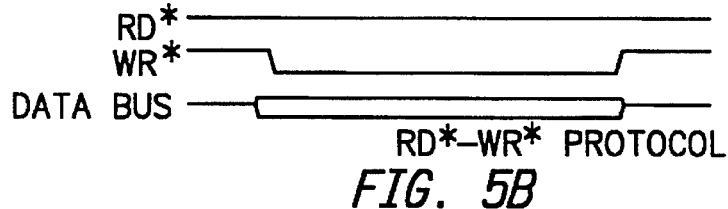

An example of the bus adaptation circuit 69 is shown in FIG. 3. The different protocols of control signals which may be connected to the pins 63, 65 and 67 will first be explained. Pins 63 and 65 are designed for connection with the two control lines in the microprocessor 11 which designate whether the peripheral is to be read from or written to. There are two well-known read/write control protocols to which the circuit 69 adapts. One is illustrated in FIG. 5. In this case, one of the control signals is a read (RD*) signal and the other is a separate write (WR*) signal. As shown in FIG. 5(A), a read operation occurs when the read (RD*) control signal goes low while the write (WR*) signal remains high. The reverse occurs during a write operation, as indicated in FIG. 5(B). With this protocol, the RD* control signal from the microprocessor is connected to the pin 63, while the WR* signal is connected to the pin 65.

Figure 6A:
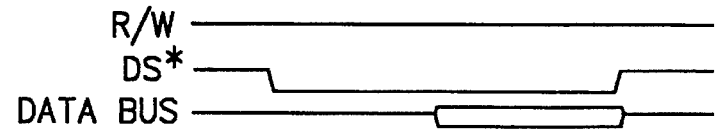
FIGS. 6(A) and 6(B) provide waveforms to illustrate another existing read-write protocol.
Figure 6B:
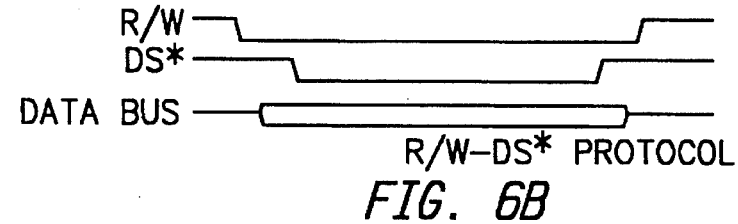

In the second type of read-write signaling, illustrated in FIG. 6, the control signals are a direction line, which may be designated R/W or W/R, and one or more data strobes, designated DS* or UDS* and LDS*. According to this protocol, as shown in FIG. 6(A), a signal designated R/W remains high when a read operation is occurring, and, as shown in FIG. 6(B), drops low when a write operation is occurring. The data strobe signal(s) DS* or UDS* and LDS* work(s) the same in either a read or write operation, simply to designate when one or the other function is to be executed. In the adaptation circuit 69, the R/W signal from a microprocessor utilizing this protocol is connected to a pin 63, while the DS* or LDS* signal is connected to the pin 65. It will also be noted from FIG. 3 that a W/R signal is also indicated as an alternative to be connected to the pin 63. The W/R notation indicates an reverse polarity of the R/W signal, which is a variation of the protocol illustrated in FIG. 6. This variation is also detected and the circuit adapted to it, in the manner explained below.

Before proceeding to describe the operation of the adaptation circuits of FIG. 3, the microprocessor control signals which may be connected with the pin 67 will be explained. If the system in which the peripheral is being used only has an 8-bit data bus, pin 67 is then connected permanently to a high voltage such as $V_{CC}$. If a 16-bit data bus, any one of the control signals indicated in FIG. 3 that is utilized by the microprocessor of the system is connected to the pin 67. These three signals are the upper data strobe (UDS*), a strobe for the D15-8 data bus pins, the bus high enable (BHE*), a control signal that is low if data is to be transferred on the data bus portion D15-8, or byte/word select (B/W), a control signal that is low if 16 bits of data are to be transferred. One of these standard control signals, possibly in conjunction with the A0 address pin 71, specifies how bytes of data are transferred on the lower and upper byte data bus portions when a 16-bit wide system bus is being used.

Similarly, if the system in which the peripheral is being used includes an A0 line, it should be connected to the pin 71, otherwise pin 71 should be connected to a fixed logic level (e.g., $V_{CC}$ or ground).

In order to detect the protocols of the control signals received at pins 63, 65 and 67, and on address line A0, a bus type detection circuit 83 and polarity adaptation circuit 85 are provided (FIG. 3). Circuit 83 learns about the system control signal protocols being utilized during the first cycles of operation of the system after initialization or reset, which are typically directed to system read-only-memory (ROM) and random-access-memory (RAM). Circuit 85 learns more about the system control signal protocols from the first cycle directed to this peripheral 17, which needs to be one in which the microprocessor writes a byte to the peripheral on the D7-0 data bus pins.

The bus type detection circuits 83 include three latches 87, 89, and 91. All three latches are cleared/reset when the RESET* signal becomes active. This occurs at the beginning of any system initialization cycle, and places the latches of the circuit 83 in an initial state. The latch 87 will remain reset, giving a signal in an output line 93 that indicates an 8-bit bus is being utilized, unless the signal on the pin 67 goes active low. In the latter case, the latch 87 is set and the signal in the line 93 indicates that a 16-bit bus is being utilized.

The second latch 89 is clocked by any rising transition that might occur on the A0 line 71, which causes the voltage $V_{CC}$ to be latched and presented at an output 95 if there is any activity on the A0 line. If there is, that indicates that microprocessor uses the A0 line and the signal in the line 95 provides that information. If not, the latch 89 remains in a cleared state and its output in line 95 indicates that.

The third latch 91 is set by the signals on the pins 63 and 65 both being active, as detected by the gate 97. If both signals are active at the same time, the state which is latched and presented on the signal 99 indicates that a direction line and one or more data strobes are being utilized as in FIG. 6, since only in FIG. 6(B) do both of the signals on those pins become active at the same time. If the signals at the pins 65 and 63 are never simultaneously low, this indicates that separate read and write strobes are being utilized as in FIG. 5, and the state of the latch 91 remains reset and provides an indication of that in the line 99.

The polarity adaption circuit 85 learns more about the protocols being used. Another latch 101 is enabled through an AND-gate 103, the first time after a Reset that the signal levels on the pins 63 and 65 are both low, to latch the voltage level in the A0 address line 71 and give an indication in line 105 as to whether A0 was high or low in said first cycle. Since this is occurring during a write operation to this peripheral using the lower data byte D7-0 of the data bus, the polarity of the A0 signal that designates the lower byte is thus captured. In microprocessor systems that use the A0 line to control whether the upper or lower data bus bytes are being used, the polarity protocol to designate each is thus learned.

Another latch 107 is similarly enabled and latches the voltage state of the pin 63 and presents that at an output 109. Since the first cycle is known to be a write, a low voltage level so latched indicates that if the read/write protocol of FIG. 6 is being utilized, the polarity on the pin 63 to indicate a write is low, as indicated in FIG. 6(B). However, if that voltage is high, it indicates a W/R signal, rather than an R/W signal, is connected to the pin 63, so that a write operation is indicated by a high and a read operation by a low.

Finally, with respect to the polarity adaption circuits 85, another latch 111, connected to be cleared when a system RESET* signal is asserted low, is connected to disable the AND-gate 103 after the first write cycle directed toward this peripheral, thereby assuring that the state of the latches 101 and 107 is not altered during subsequent operation of the peripheral.

To summarize the state of the signals for various protocols being detected, the following are the states learned by the latches 87, 89, 91, 101 and 107 respectively:

| | |
|---|---|
| D16 (line 93) | true/high for a 16-bit data bus (false/low for an 8-bit bus) |
| USEA0 (line 95) | true/high if A0 is being used (false/low for UDS*-LDS* system) |
| DIRDS (line 99) | true/high for a system with a direction line and a common data strobe (false/low for separate read and write strobes) |
| FirstA0 (line 105) | the state of A0 as of the first cycle with this device after a Reset, which must be an 8-bit write on the D7-0 lines |
| FirstDir (line 109) | the state of RD*-R/W-W/R as of the first cycle with this device after a Reset, which must be an 8-bit write on the D7-0 lines. |

Outputs of the learning latches, in lines 93, 95, 99, 105 and 109, as well as connections from the pins 63, 65 and 67, and from the address A0 line 71, are all combined in a logic circuit 113 to provide the internal control signals 73–77 which have a common protocol no matter which of the various control signal protocols discussed above is being used by the system microprocessor 11. The logical function to be executed by the circuit 113 is given by the following equations; wherein the symbol "!" is used to indicate logical negation (inversion), the symbol "+" is used to indicate logical inclusive ORing, and the symbol "&" is used to indicate logical ANDing:

| | |
|---|---|
| DHi = | !UDS*-BHE*-B/W + (D16 & USEA0 & XA0) |
| DSwap = | !D16 & XA0 |
| DLo = | (!WR*-DS*-LDS* & !USEA0) + (!D16 &!XA0) + (USEA0 &!XA0) + USEA0 & !UDS*-BHE*-B/W & !A0 |
| RD = | (!RD*-R/W-W/R & !DIRDS) + (R/W & DS) |
| WR = | (!WR*-DS*-LDS* & !DIRDS) + (!R/W & DS) |

The logic terms used in the above equations are those included in FIG. 3 to identify various signals, along with intermediate terms which are defined as follows:

| | |
|---|---|
| XA0 = | A0 xor FirstA0 |
| R/W = | RD*-R/W-W/R xor FirstDir |
| DS = | (!WR*-DS*-LDS* & DIRDS) + (!UDS*-BHE*-B/W & !USEA0) |

This results in output signals in lines 73–77, which, through their connections as inputs to the AND-gates 33, 37, 51, 53, 41 and 45, control data transfer between the external data bus pins 27 and 29 and an internal data bus connected with the functional circuit portions 23, as follows:

| | |
|---|---|
| DHi (line 75) | true/high if the D15-8 pins should be connected to the INT_D15-8 bus |
| DSwap (line 74) | true/high if the D7-0 pins should be connected to the INT_D15-8 bus |
| DLo (line 73) | true/high if the D7-0 pins should be connected to the INT_D7-0 bus |
| RD (line 76) | true/high for a Read cycle |
| WR (line 77) | true/high for a Write cycle |

Figure 4:
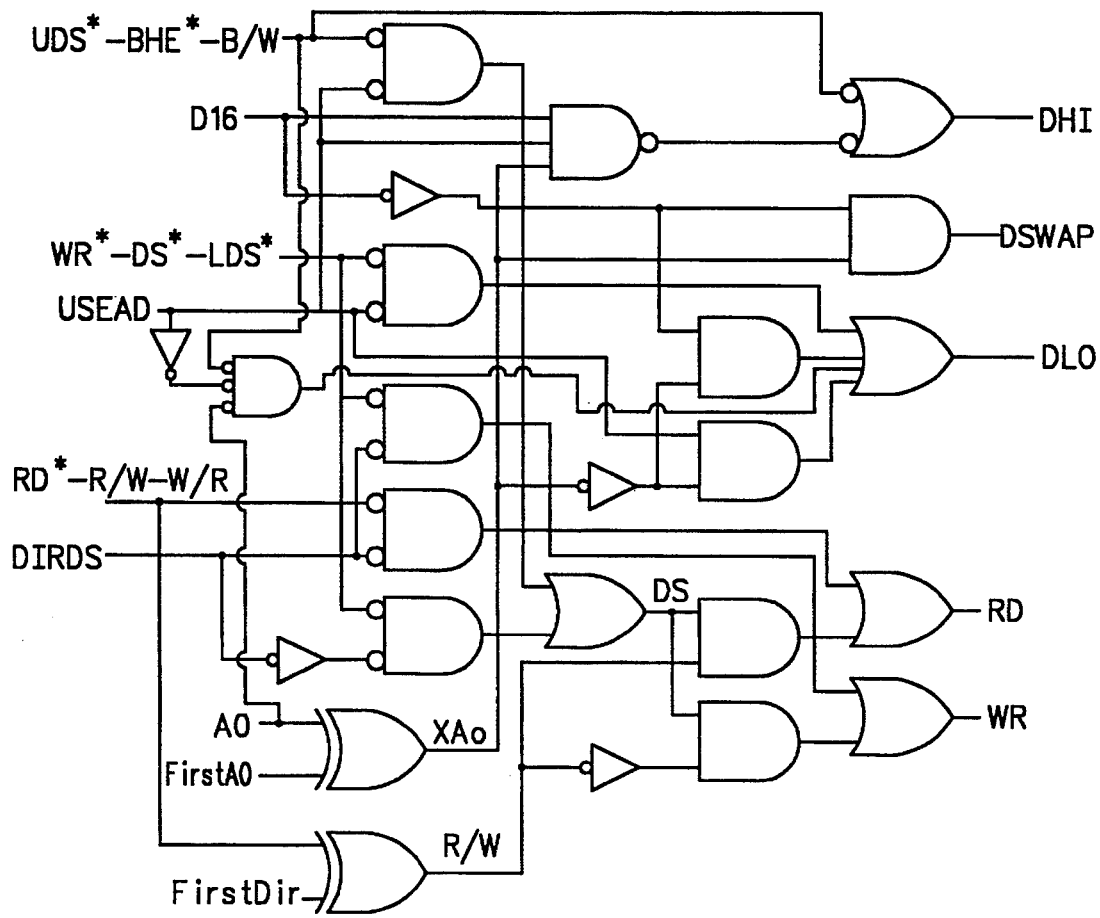
FIG. 4 is a circuit diagram of one of the blocks shown in FIG. 3.

An example of a logic circuit for the block 113 of FIG. 3, which implements the logic equations given above and provides the foregoing outputs in response to the learned states held in the various latches, is given in FIG. 4.

Referring again to FIG. 2, another learning capability is provided by circuits indicated as a block 121 which operate separately from the bus type adaption circuit 69. The circuits 121 provide the capability of learning in a first cycle, directed to a memory or another peripheral device, which of two microprocessor/peripheral speed matching signaling protocols is used. The circuits adapt a single pin 123 to operate with either the standard wait protocol indicated in FIG. 7 or the standard acknowledge protocol indicated in FIG. 8. An example implementation of the circuit 121 is given in FIG. 9. The circuit automatically adapts to either of the wait or acknowledge protocols by asserting the appropriate signals in a single pin 123 that is connected to provide signals to the speed matching pin of the microprocessor. No separate pins are required for this peripheral chip to learn the correct protocol, nor need any register be loaded as part of the initialization process. No extra circuits are required outside of the peripheral device to accomplish this learning function. The circuit simply observes the nature of the speed matching signal generated from memory or some other peripheral in the system in response to a read or write command to it by the microprocessor and adjusts its operation to match that observed to be performed by the memory or other peripheral.

Figure 7:
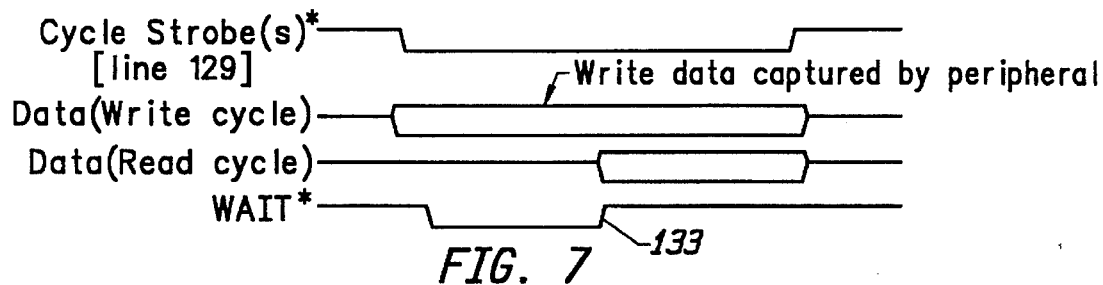
FIG. 7 is a set of waveforms that illustrates a wait control signal protocol.
Figure 8:
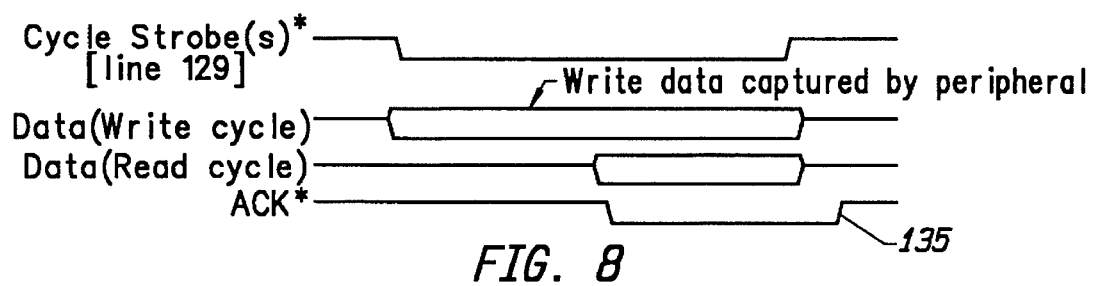
FIG. 8 is a set of waveforms that shows an acknowledge signal protocol.
Figure 9:
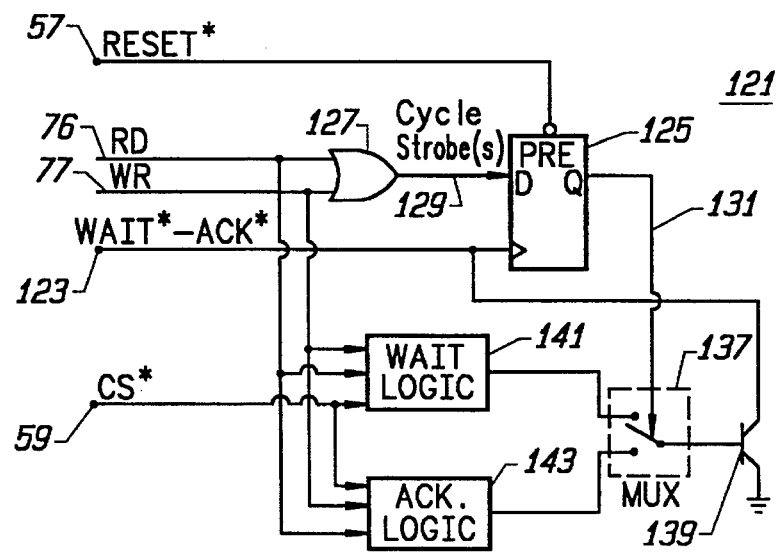
FIG. 9 is a circuit diagram illustrating another of the blocks of the circuit of FIG. 2.

Central to the learning capability of the circuit 121, as illustrated in FIG. 9, is a latch 125 that is initially preset to the "one" state by a RESET* signal that is made active at the beginning of any computer initialization process. An OR-gate 127 generates in a line 129 a "cycle strobe" signal that is active when either a read or write operation is occurring somewhere in the computer system, by having lines 76 and 77 as inputs. The rising (trailing) edge of the speed matching signal observed at pin 123 causes the latch 125 to capture at its output 131 the state of the cycle strobe signal in line 129 at that instant. As can be seen by comparing FIGS. 7 and 8, a rising edge 133 of the wait signal occurs during an active cycle strobe in line 129, and thus leaves the output 131 in its "one" state as after Reset. If the signal received at the pin 123 is the acknowledge type, as shown in FIG. 8, a rising edge 135 occurs after termination of the cycle strobe in line 129 and thus forces the output 131 of the latch 125 to its "zero" state. The timing of the alternative wait or acknowledge signals from a memory or another peripheral in the system exists as a result of one of those standards being used and is simply being observed by the circuits 121 in order to set itself to operate in accordance with that standard. The selection of the WAIT* signal alternative when RESET* is asserted is significant in that a WAIT* signal may not be asserted during the initial cycles in a system using that protocol, but an ACK* signal is always asserted for each cycle in such a system.

Once the latch 125 has learned which standard is being employed by the system, its output 131 sets a switch (multiplexer) 137 to connect the input of a driver 139 to an output of either a wait logic circuit 141 or an acknowledge logic circuit 143. The driver 139 makes its output low while the selected signal is active. The wait logic circuits 141 cause the driver 139 to drive its output low as indicated in FIG. 7 for the WAIT* signal. Similarly, the acknowledgement logic circuit 143 makes the driver 139 generate the ACK* pulse of FIG. 8. The selection of one of those circuits causes the appropriate speed matching signal to appear at the pin 123 when a read or write operation is occurring and the current peripheral is selected by a CS* signal at the pin 59.

Although the various aspects of the present invention have been described with respect to the preferred embodiments, it will be understood that the invention is protected within the full scope of the appended claims.

It is claimed:

1. In a peripheral integrated circuit chip having a plurality of connection pins adapted to be connected to a microprocessor through an address and data bus and a plurality of control and status lines, a circuit that automatically responds to different microprocessor signal protocols to configure operation of drivers and receivers connected to the data bus pins, comprising:

a first storage means operably connected to receive signals from first and second connection pins for being placed into a first state by assertion of an active reset microprocessor control signal on said first pin and into a second state by assertion of an active signal of any of a bus high enable, byte/word select or upper data strobe microprocessor control signal applied to said second pin, whereby the state of the first storage means indicates whether an 8-bit or a 16-bit bus is being used by the microprocessor, a second storage means operably connected to receive signals from said first pin and a third pin-connectable to an A0 line of the address bus for being placed into a first state by assertion of the active reset signal on said first pin and into a second state in response to activity on said third pin, whereby the state of the second storage means indicates whether the A0 address line is being used by the microprocessor, a third storage means operably connected to receive signals from said first pin and additional fourth and fifth pins for being placed into a first state by assertion of the active reset signal on the first pin and into a second state by a simultaneous assertion of a data strobe signal on the fourth pin and a read/write control signal on the fifth pin, whereby the state of the third storage means indicates the read and write control signal protocol being used by the microprocessor, and means responsive to the states of each of the first, second and third storage means for controlling operation of said data bus drivers and receivers.

2. The peripheral chip circuit according to claim 1 which additionally comprises:

a fourth storage means connected to capture the state of a signal on said third pin when the chip is first accessed by a chip select signal derived from the microprocessor after a system reset signal is received by said first pin, whereby the fourth storage means state indicates mapping being used by the microprocessor between the signal on said third pin and two halves of said data bus, a fifth storage means connected to capture the state of the signal on said fifth pin when the chip is first accessed by the chip select signal after a system reset signal is received by said first pin, whereby the fifth memory means state indicates the polarity of a read/write control signal being used by the microprocessor, and said data bus driver and receiver operation controlling means additionally includes means responsive to the states of each of the fourth and fifth storage means for controlling operation of said data bus drivers and receivers.

3. A peripheral integrated circuit connectable to any one of at least two types of microprocessors characterized by different control protocols including a first type that transmits a WAIT signal using a wait protocol through a first output and a read signal through a second output of said first type, a second type that transmits an ACK signal using an acknowledge protocol through a first output and a read signal through a second output of said second type, wherein said first type of microprocessor transmits a write signal through a third output of said first type and said second type of microprocessor transmits a write signal through a third output of said second type, said peripheral integrated circuit comprising:

a first input contact connectable to said first outputs of said first and second types of microprocessors, and connected to a selected one of said first and second types, a second input contact connectable to said second outputs of said first and second types of microprocessors, and connected to said selected one of said first and second types, a third input contact connectable to said third outputs of said first and second types of microprocessors, and connected to said selected one of said first and second types, and a logic circuit connected to said first, second and third input contacts, wherein said logic circuit generates at least one internal control signal having a logic state indicative of whether said selected one is said first or second type of microprocessor, said logic circuit including an OR gate having a first input responsive to a signal received at said second input contact, a second input responsive to a signal received at said third input contact, and an output, and a flip-flop having a data input connected to said output of said OR gate, a clock input connected to said first input contact, and an output providing said at least one internal control signal having said logic state indicative of whether said selected one is said first or second type of microprocessor.

* * * * *